United States Patent
Yanase et al.

(10) Patent No.: US 8,971,632 B2
(45) Date of Patent: Mar. 3, 2015

(54) SYSTEM FOR FEATURE DETECTION FOR LOW CONTRAST IMAGES

(75) Inventors: Masakazu Yanase, Vancouver, WA (US); Chang Yuan, Vancouver, WA (US); Xinyu Xu, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 597 days.

(21) Appl. No.: 12/859,637

(22) Filed: Aug. 19, 2010

(65) Prior Publication Data
US 2012/0045135 A1    Feb. 23, 2012

(51) Int. Cl.
*G06K 9/46* (2006.01)
*G06K 9/66* (2006.01)
*G06K 9/38* (2006.01)

(52) U.S. Cl.
CPC .............. *G06K 9/4604* (2013.01); *G06K 9/38* (2013.01)
USPC ........................................................ 382/190

(58) Field of Classification Search
CPC ..................................................... G06K 9/525
USPC ..................................... 382/190, 199, 205, 228
See application file for complete search history.

(56) References Cited

U.S. PATENT DOCUMENTS

| | | | |
|---|---|---|---|
| 4,685,143 A | 8/1987 | Choate | |
| 6,681,032 B2 | 1/2004 | Bortolussi et al. | |
| 7,065,262 B1 | 6/2006 | Silver et al. | |
| 8,150,121 B2 * | 4/2012 | Gindele et al. | 382/128 |
| 8,189,049 B2 * | 5/2012 | Lopota et al. | 348/152 |
| 2003/0103662 A1 * | 6/2003 | Finkbeiner | 382/128 |
| 2004/0208364 A1 * | 10/2004 | Haque et al. | 382/171 |
| 2005/0222705 A1 | 10/2005 | Budd | |
| 2008/0152259 A1 * | 6/2008 | Burns et al. | 382/284 |
| 2009/0129671 A1 * | 5/2009 | Hu et al. | 382/173 |
| 2009/0279755 A1 * | 11/2009 | Gindele et al. | 382/128 |
| 2010/0157110 A1 * | 6/2010 | Hatanaka et al. | 348/241 |
| 2010/0201820 A1 * | 8/2010 | Lopota et al. | 348/152 |
| 2012/0045135 A1 * | 2/2012 | Yanase et al. | 382/201 |

FOREIGN PATENT DOCUMENTS

| | | |
|---|---|---|
| JP | 7-129770 A | 5/1995 |
| JP | 7-209402 A | 8/1995 |
| JP | 9-282452 A | 10/1997 |
| WO | WO2007128452 A2 | 11/2007 |

OTHER PUBLICATIONS

Japanese Official Communication, dated May 27, 2014, Japanese Patent App. No. 2011-052177, Sharp Kabushiki Kaisha, 2 pgs.
English translation of Japanese Official Communication, dated May 27, 2014, Japanese Patent App. No. 2011-052177, Sharp Kabushiki Kaisha, 4 pgs.
Reference 2011-052177, vol. J77-D-II, No. 3, pp. 625-627, 1994.
English translation of Patent Abstract for Japanese Patent Publication No. 09-282452, published Oct. 31, 1997, 1 pg.
English translation of Patent Abstract for Japanese Patent Publication No. 07-209402, published Aug. 11, 1995, 1 pg.
English translation of Patent Abstract for Japanese Patent Publication No. 07-129770, published May 19, 1995, 1 pg.

* cited by examiner

*Primary Examiner* — Aaron W Carter
(74) *Attorney, Agent, or Firm* — Chernoff Vilhauer McClung & Stenzel, LLP

(57) ABSTRACT

A system for the identification of feature points in low contrast images.

8 Claims, 9 Drawing Sheets

SYSTEM FOR FEATURE DETECTION FOR LOW CONTRAST IMAGES

CROSS-REFERENCE TO RELATED APPLICATIONS

None.

BACKGROUND OF THE INVENTION

The present invention relates to a system for feature detection suitable for low contrast images.

There exist many different image matching techniques that are used for image retrieval, object identification, object detection, and object characterization. One such image matching technique uses feature based identification. In particular, the feature based identification may identify corners of one or more images as being indicative of the object, and may also include a set of vectors describing each set of corresponding feature points. The corresponding vectors may be used to compare the similarity of the objects in different images.

In general, even if the captured object in one image is same object as that is captured in another image, the size, the rotation, the brightness and the color of each of the objects are frequently different. Some feature point detection techniques are based upon a Harris Corner Detector, SIFT, and Determinant of Hessian.

The Harris Corner Detector extracts feature points by using a first-order derivative of an image. The SIFT extracts feature points by uses a Difference of Gaussian (DoG), which is similar to a second order derivative, by removing points that have low contrast. The Determinant of Hessian uses a Hessian matrix, which is a second-order derivative of an image. In general, these "derivative based" techniques are able to detect feature points when the contrast remains sufficiently high.

Referring to FIG. 1, another feature point detector further includes histogram based equalization. The histogram based technique expands the global contrast of an image when the original contrast of the image is small. Then the histogram based technique calculates a histogram of code values of the whole image. Then if the difference between the maximum value of histogram and the minimum value of the histogram is sufficiently small, the technique adjusts the histogram by changing the maximum value of histogram to the maximum value of code values and changing the minimum value of histogram to the minimum value of code values. The adjusted image from the histogram based equalization may be further processed by one of the above-described derivative based feature point techniques. Unfortunately, the histogram based equalization technique tends to amplify noise in the image, thereby producing a significant number of false positives.

DETAILED DESCRIPTION OF PREFERRED EMBODIMENT

The feature point identification process should be suitable to identify feature points, in both high contrast and low contrast situations without substantially enhancing the noise in the image. To facilitate feature identification in images having low contrast in the region proximate a feature, a regionalized processing of the image should be performed. This regionalized image processing localizes the contrast determination which increases the ability to properly identify feature points. In addition, it was determined that a measure of the amount of contrast necessary to identify a feature point is dependent on the contrast.

Figure 1:
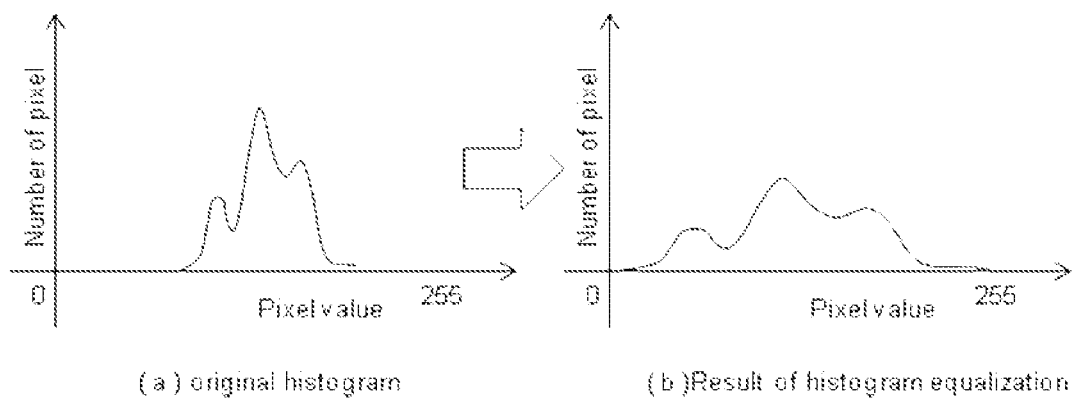
FIG. 1 illustrates histogram equalization.
Figure 2:
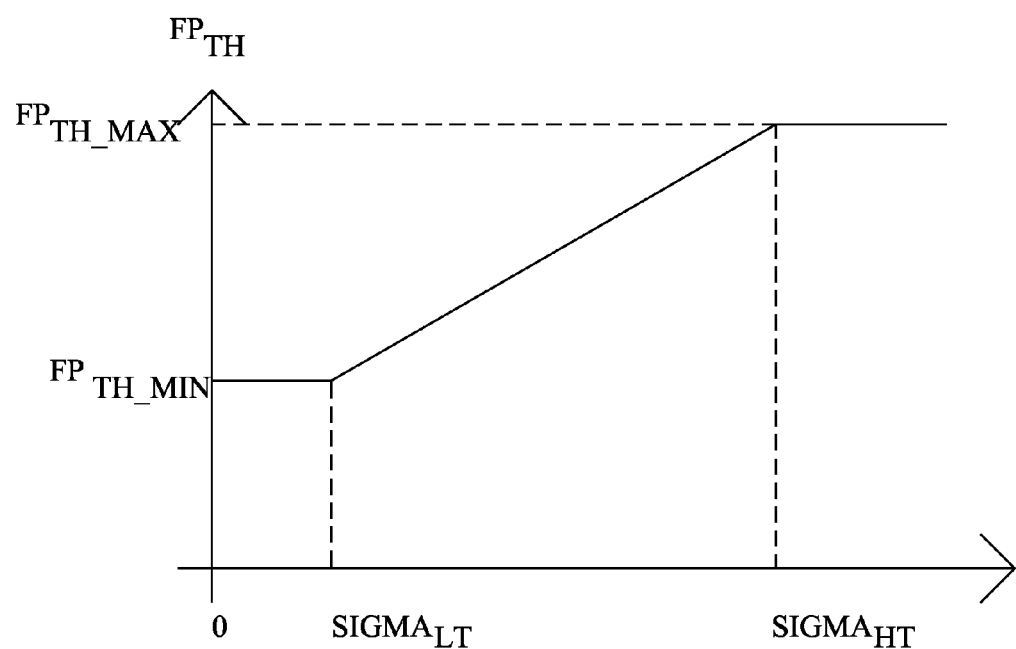
FIG. 2 illustrates thresholds based upon standard deviation.

Referring to FIG. 2, a preferred technique for feature point determination includes using a standard deviation, a variance, or any other suitable statistical measure generally related to contrast. The standard deviation $\sigma$ is illustrated on the horizontal axis. When using the standard deviation $\sigma$, the system may use a function that includes a variable threshold for identifying feature points based upon the value of the standard deviation $\sigma$. The standard deviation $\sigma$ based function may include a lower threshold $\sigma_{Lt}$ and the standard deviation $\sigma$ based function may include a higher threshold $\sigma_{Ht}$. At different values of the standard deviation $\sigma$ based function, an appropriate variable threshold value may be used to identify feature points. By using such a variable threshold value, the system can select an appropriate threshold value based upon the contrast in the localized region of the image. The vertical axis illustrates a variable threshold value "FP" for feature point selection. The variable threshold value for a feature point "FP" may include a lower threshold $FP_{Th\_Min}$ and the variable threshold value for a feature point "FP" may include a higher threshold $FP_{Th\_Max}$. If $\sigma$ is larger than $\sigma_{Ht}$, then the system uses $FP_{Th\_Max}$ as the threshold value above which a feature point is identified. On the other hand, if $\sigma$ is smaller than $\sigma_{Lt}$, then the system uses $FP_{Th\_Min}$ value as the threshold value a above which a feature point is identified. In the range between $\sigma_{Lt}$ and $\sigma_{Ht}$ a function may join the different regions. The variable threshold value function may be a linear line, a non-linear line, or any other type of function.

The lower limit of standard deviation $\sigma_{Lt}$ reduces the likelihood of detecting false feature points in regions having low contrast, such as uniform regions. In other words, this reduces the likelihood of over detection of feature points in relatively uniform local regions. In relatively uniform local regions there are no corners and such a relatively uniform region will have a small standard deviation.

The higher limit of standard deviation $\sigma_{Ht}$ reduces the likelihood of not detecting feature points in regions having high contrast, such as corner regions. In other words, this reduces the likelihood of under detection of feature points in relatively high contrast local regions. In relatively high contrast local regions there are corners and such a relatively high contrast location region will have a large standard deviation.

Figure 3:
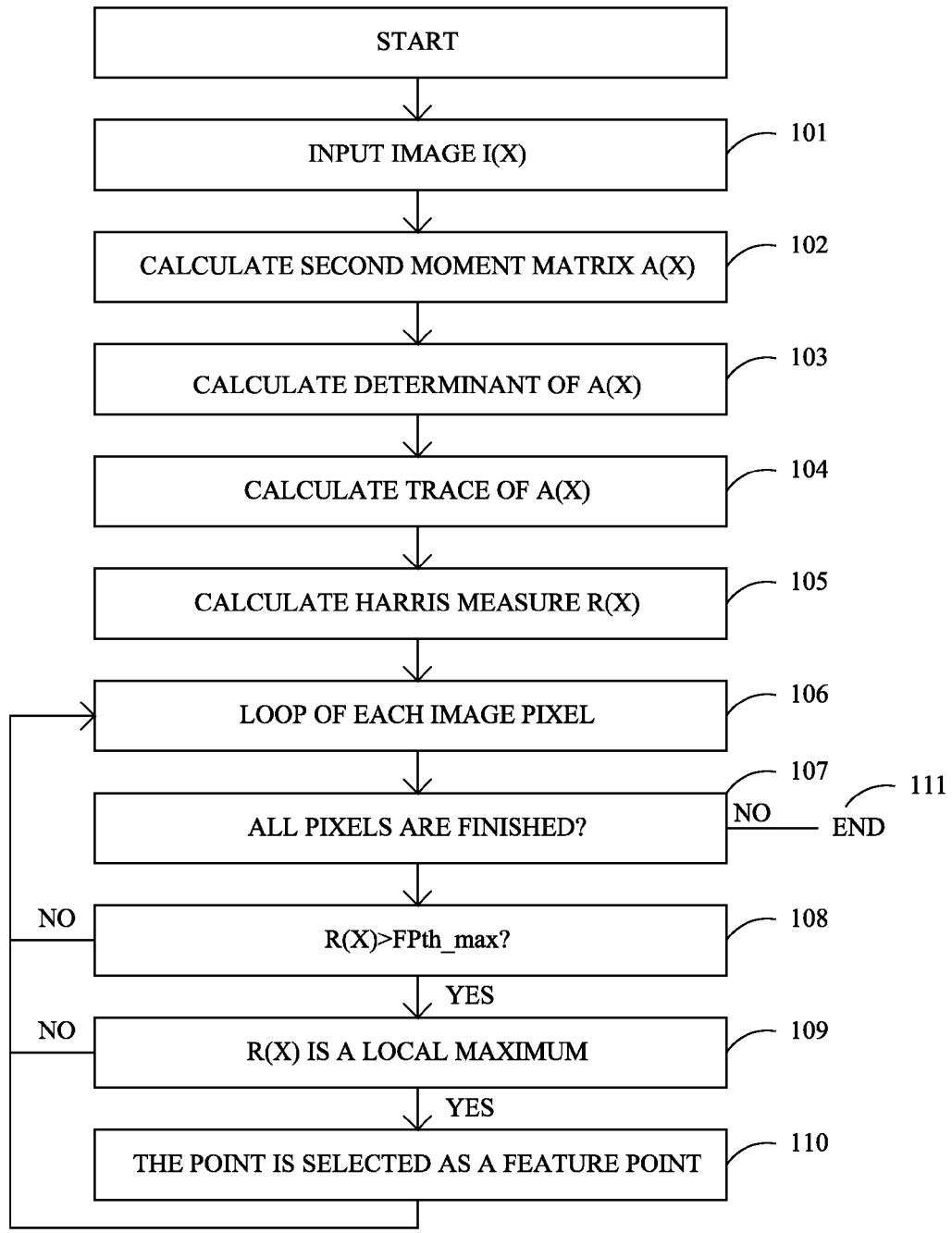
FIG. 3 illustrates a feature point detector.

Referring to FIG. 3, by way of example, a Harris Corner Detector is used as an exemplary example for implementing a feature point detection. Other feature point detection techniques may likewise be used. An image 101 is provided to the feature point detector. The image may be obtained from any source, such as for example, it can be obtained from a camera, or it can be obtained from a file stored on a storage device. In addition, the system may include pre-stored threshold settings for the feature point detector, or may load suitable threshold settings for the feature point detector.

A second moment matrix A(x) 102 is calculated. The A(x) matrix 102 may be defined as illustrated in equation 1.

$$A(x) = \sum_{x,y} w(x, y) \begin{bmatrix} L_x^2(x) & L_x L_y(x) \\ L_x L_y(x) & L_y^2(x) \end{bmatrix} \quad (1)$$

where Lx and Ly are respective derivatives of input image I(x) in the x and y direction. LxLy(x) are the product of Lx and Ly. w(x,y) is a weighting function, such as for example, a uniform or Gaussian filter as shown in equation 2.

$$w(x, y) = g(x, y, \sigma) = \frac{1}{2\pi\sigma} e^{\left(-\frac{x^2+y^2}{2\sigma^2}\right)} \quad (2)$$

The determinant of A(x) 103 is calculated. Also, the trace of A(x) 104 is calculated. Based upon the determinant of A(x) 103 and the trace of A(x) 104, a Harris measure R(x) 105 is calculated. One calculation for the Harris measure R(x) is shown in equation 3.

$$R(x) = \det(A) - \alpha \operatorname{trace}^2(A) \quad (3)$$

The determinant of A(x) 103, the trace of A(x) 104, and the Harris measure R(x) 105 are preferably calculated on the entire image, as a whole. The remaining calculations for the feature point detection are preferably performed on a pixel basis. The technique checks to see if all the desired pixels are processed 107, if yes, then the technique ends 111. If all the desired pixels are not processed 107, then the pixel based process continues.

R(x), which is a measure of the likelihood of a pixel being a feature point, is compared with $FP_{Th\_max}$ 108. If R(x) is larger than $FP_{Th\_max}$, then processing continues for the processed pixel. Otherwise, the pixel is determined not to be a feature point, and the process continues with another pixel 106.

Figure 4:
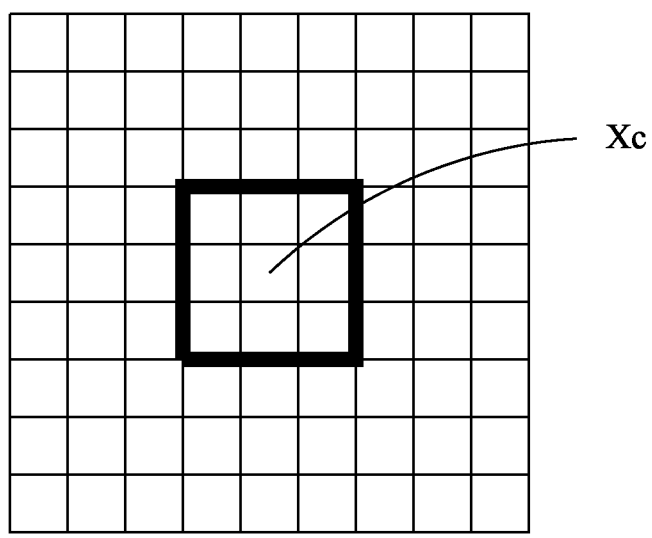
FIG. 4 illustrates a local 8-neighbor of pixel Xc.

R(x) of current pixel is checked to determine if it is a local maximum or not 109. To determine if it a local maximum, the system may compare $R(X_c)$ with 8 neighbors around $X_c$, as illustrated in FIG. 4. If a value of $R(X_c)$ is larger than those of all of 8 neighbors, the current pixel is judged as a local maximum. If the pixel is judged to be a local maximum, then the system then selects the processed pixel as a feature point 110. Otherwise, the pixels is not judged to be a local maximum, and thus not a feature point, and the process continues with another pixel 106.

Figure 5A:
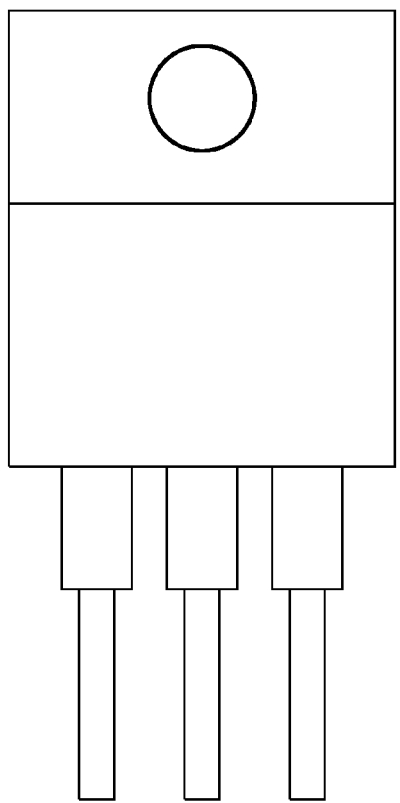
FIGS. 5A and 5B illustrate a model image and input image.
Figure 5B:
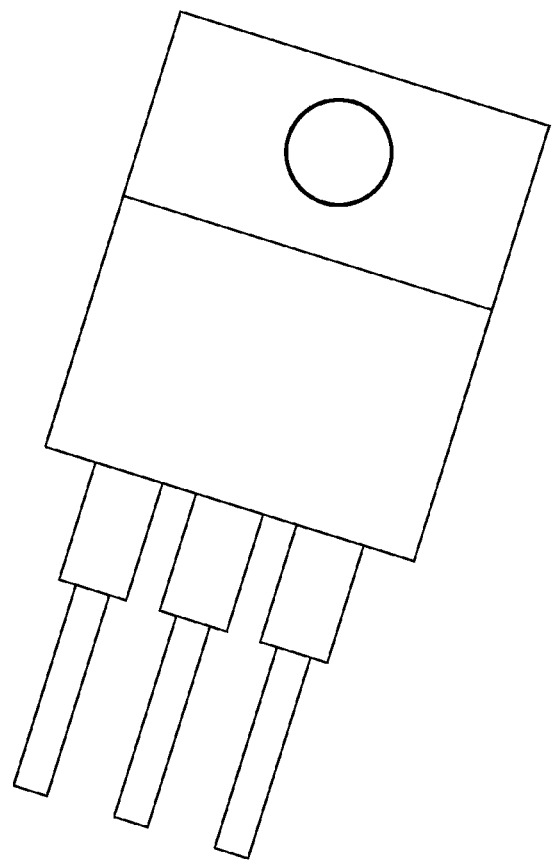

Referring to FIGS. 5A and 5B by way of example, a "model image" was used as a reference and an "input image" was used based upon the technique illustrated in FIG. 3. The model image illustrates a standard transistor and the input image illustrates a captured image of a transistor. While not shown in FIGS. 5A and 5B, there are minor differences in the color, sharpness, and contrast between the model image and the input image.

Figure 6A:
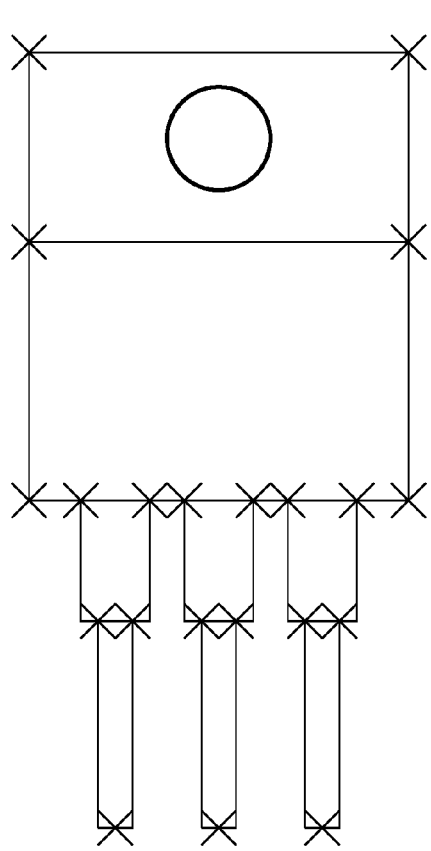
FIGS. 6A and 6B illustrate a model image and input image as a result of the detector of FIG. 3.
Figure 6B:
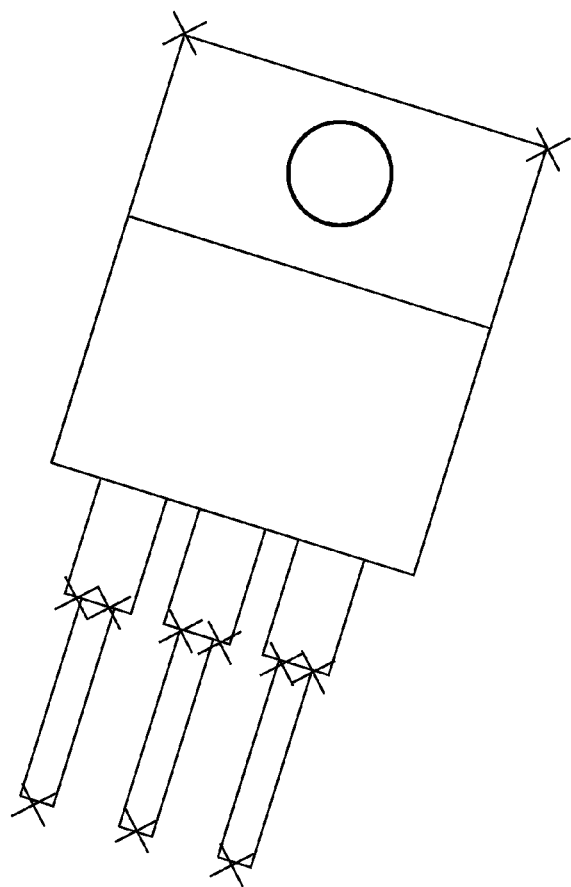

Referring to FIGS. 6A and 6B as a result of the feature point identification technique illustrated in FIG. 3, many feature points were properly detected in the model image indicated by an "x". However, many of these feature points are not detected in the input image, primarily due to a lower contrast in the input image.

Figure 7:
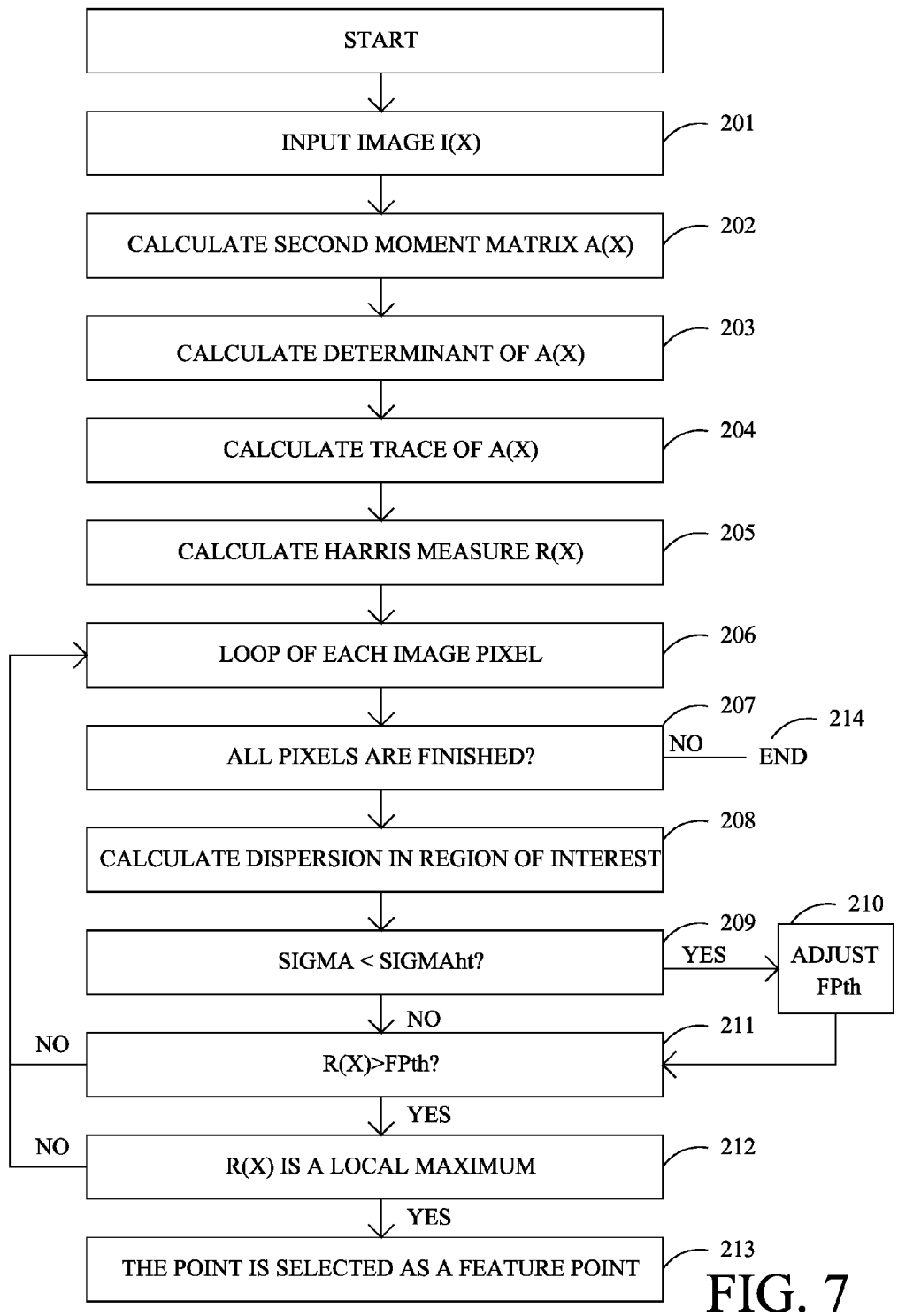
FIG. 7 illustrates a modified feature point detector.

FIG. 7 shows a modified feature point detection technique, using the Harris Corner Detector, as its processing technique. An image 201 is provided to the feature point detector. The image may be obtained from any source, such as for example, it can be obtained from a camera, or it can be obtained from a file stored on a storage device. In addition, the system may include pre-stored threshold settings for the feature point detector, or may load suitable threshold settings for the feature point detector. Some initial settings may be loaded, such as size of ROI (region of interest), RoiLen, that is used to calculate dispersion within the ROI, a threshold for feature point detector $FP_{Th\_Max}$, a higher threshold of standard deviation $\sigma_{Ht}$, a lower threshold of standard deviation $\sigma_{Lt}$, a minimum threshold of feature point detector $FP_{Th\_min}$, and such. By way of example, the following settings may be used, RoiLen=7, $FP_{Th\_Max}$=40, $\sigma_{Ht}$=30.0, $\sigma_{Lt}$=5.0. $FP_{Th\_min}$=3.

A second moment matrix A(x) 202 is calculated. The A(x) matrix 202 may be defined as illustrated in equation 4.

$$A(x) = \sum_{x,y} w(x, y) \begin{bmatrix} L_x^2(x) & L_x L_y(x) \\ L_x L_y(x) & L_y^2(x) \end{bmatrix} \quad (4)$$

where Lx and Ly are respective derivatives of input image I(x) in the x and y direction. LxLy(x) are the product of Lx and Ly. w(x,y) is a weighting function, such as for example, a uniform or Gaussian filter as shown in equation 5.

$$w(x, y) = g(x, y, \sigma) = \frac{1}{2\pi\sigma} e^{\left(-\frac{x^2+y^2}{2\sigma^2}\right)} \quad (5)$$

The determinant of A(x) 203 is calculated. Also, the trace of A(x) 204 is calculated. Based upon the determinant of A(x) 203 and the trace of A(x) 204, a Harris measure R(x) 205 is calculated. One calculation for the Harris measure R(x) is shown in equation 6.

$$R(x) = \det(A) - \alpha \operatorname{trace}^2(A) \quad (6)$$

The determinant of A(x) 203, the trace of A(x) 204, and the Harris measure R(x) 205 are preferably calculated on the entire image, as a whole. The remaining calculations for the feature point detection are preferably performed on a pixel basis. The technique checks to see if all the desired pixels are processed 207, if yes, then the technique ends 214. If all the desired pixels are not processed 207, then the pixel based process continues.

Figure 8:
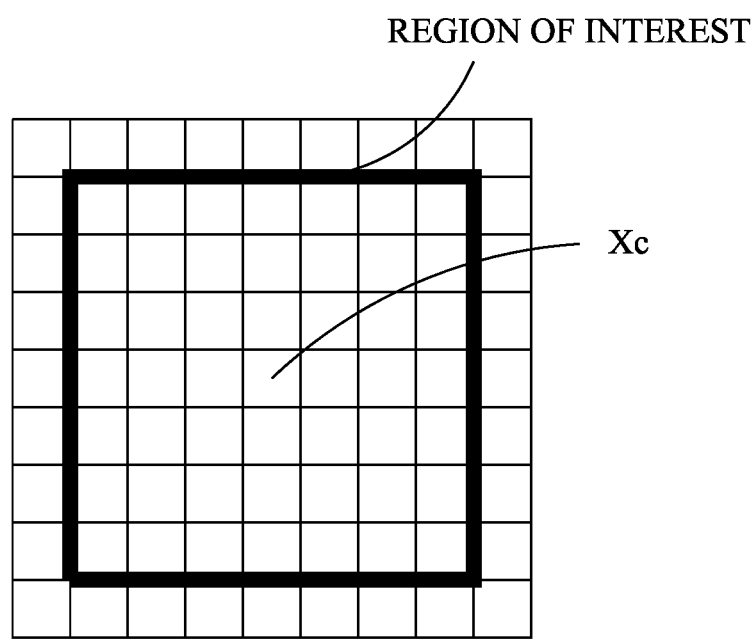
FIG. 8 illustrates a ROI dispersion.

The technique determines a region of interest ("ROI") 208, as illustrated in FIG. 8. The width and height of the ROI are RoiLen pixels. The technique then calculates a standard deviation σ of code values in the ROI that are surrounding the current pixel $X_c$.

The technique then compares σ with $\sigma_{Ht}$ 209. If σ is larger than $\sigma_{Ht}$, then $FP_{Th}$ is set to $FP_{Th\_Max}$ 209. On the other hand, if σ is smaller than $\sigma_{Ht}$, then $FP_{Th}$ is adjusted based on σ 210. If σ is smaller than $\sigma_{Ht}$ and larger than $\sigma_{Lt}$, $FP_{Th}$ is calculated based on equation 8. If σ is smaller than $\sigma_{Lt}$, then $FP_{Th}$ is set to $FP_{Th\_Min}$.

The value of $FP_{Th}$ 211 can be summarized in the following three equations.

$$FP_{Th} = FP_{Th\_Max} \quad (\text{if } \sigma >= \sigma_{Ht}) \quad (7)$$

$$FP_{Th} = \frac{FP_{Th\_Max} - FP_{Th\_Min}}{\sigma_{Ht} - \sigma_{Lt}} \sigma + \frac{FP_{Th\_Min} \times \sigma_{Ht} - FP_{Th\_Max} \times \sigma_{Lt}}{\sigma_{Ht} - \sigma_{Lt}} \quad (8)$$

(If $\sigma < \sigma_{Ht}$ and $\sigma > \sigma_{Lt}$)

$$FP_{Th} = FP_{Th\_Min} \quad (\text{if } \sigma <= \sigma_{Lt}) \quad (9)$$

The technique compares 211 R(x) with $FP_{Th}$. If R(x) is larger than $FP_{Th}$, it then checks for a local maximum 212. Otherwise this pixel is judged as a non feature point, and increments a pixel position 206. If R(x) is a local maximum 212 then the point is identified as a feature point 213.

Figure 9A:
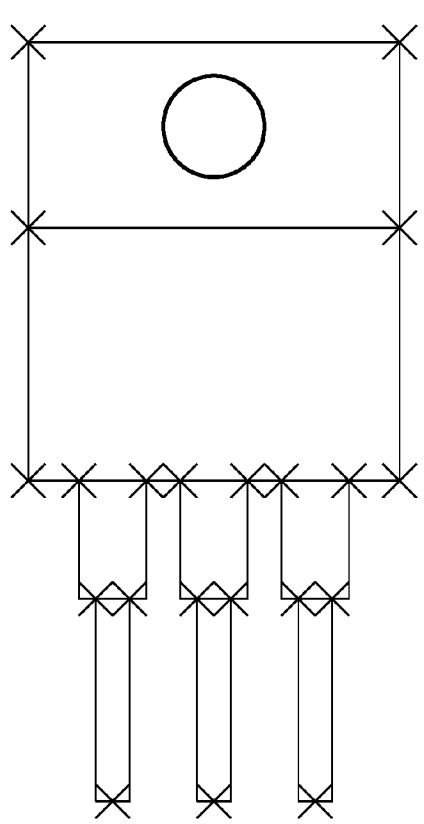
FIGS. 9A and 9B illustrate a model image and input image as a result of the detector of FIG. 7.
Figure 9B:
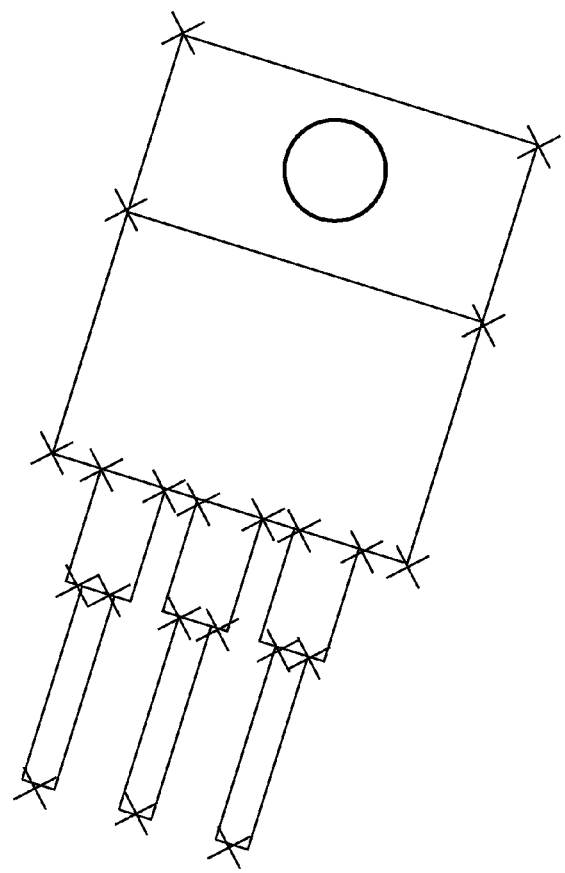

As a result of this process, the detected feature point might be like FIGS. 9A and 9B. When comparing FIG. 9(a) with FIG. 9(b), there are feature points on same points on transistors. When comparing FIG. 6(b) with FIG. 9(b), there is a difference in feature points in low contrast area. These additional feature points provide more accurate image matching The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

We claim:

1. A method for identifying feature points comprising:
   (a) receiving an image;
   (b) calculating a feature measure associated with a feature point for a plurality of pixels of said image, said feature point indicative of the content depicted in said image and used to automatically detect said content from among a plurality of images;
   (c) calculating a statistical measure with respect to one of said plurality of pixels;
   (d) based upon said statistical measure determining a threshold;
   (e) determining automatically, without user input, whether said one of said plurality of pixels is a said feature point using said threshold and said feature measure;
   (f) wherein said threshold is set to a fixed value if said statistical measure falls below a second threshold.

2. A method for identifying feature points comprising:
   (a) receiving an image;
   (b) calculating a feature measure associated with a feature point for a plurality of pixels of said image, said feature point indicative of the content depicted in said image and used to automatically detect said content from among a plurality of images;
   (c) calculating a statistical measure with respect to one of said plurality of pixels;
   (d) based upon said statistical measure determining a threshold;
   (e) determining automatically, without user input, whether said one of said plurality of pixels is a said feature point using said threshold and said feature measure;
   (f) wherein said threshold is set to a fixed value if said statistical measure exceeds a second threshold.

3. The method of claim 1 wherein said threshold is set to a second fixed value if said statistical measure exceeds a third threshold.

4. The method of claim 3 wherein said threshold varies between said fixed value and said second fixed value.

5. A method for identifying feature points comprising:
   (a) receiving an image;
   (b) providing a feature measure indicative of a feature point for a plurality of pixels of said image;
   (c) calculating a statistical measure with respect to one of said plurality of pixels;
   (d) based upon said statistical measure determining a threshold;
   (e) determining automatically, without user input, whether said one of said plurality of pixels is a said feature point using said threshold and said feature measure wherein said threshold is set to a fixed value when either: (i) said statistical measure falls below a second threshold; or (ii) said statistical measure exceeds a third threshold.

6. The method of claim 5 wherein said statistical measure is a standard deviation.

7. The method of claim 5 wherein said statistical measure is a variance.

8. The method of claim 5 wherein said determining is further based upon whether said one of said plurality of pixels is a maximum in a region of said image.

* * * * *